United States Patent [19]

Titterington et al.

[11] Patent Number: 4,889,761

[45] Date of Patent: Dec. 26, 1989

[54] SUBSTRATES HAVING A LIGHT-TRANSMISSIVE PHASE CHANGE INK PRINTED THEREON AND METHODS FOR PRODUCING SAME

[75] Inventors: Donald R. Titterington, Tualatin; Jeffrey J. Anderson; James D. Rise, both of Portland; Wayne Jaeger, Beaverton, all of Oreg.

[73] Assignee: Tektronix, Inc., Beaverton, Oreg.

[21] Appl. No.: 236,490

[22] Filed: Aug. 25, 1988

[51] Int. Cl.⁴ .................... B32B 3/00; G01D 9/00
[52] U.S. Cl. .................... 428/195; 428/207; 428/474.4; 428/913; 428/914; 427/152; 427/331; 427/346; 427/355; 427/359; 427/365; 427/366; 427/369; 427/370; 346/1.1; 346/76 PH
[58] Field of Search .......... 346/76 PH, 1.1; 428/195, 211, 913, 914, 201, 207, 474.4; 427/152, 331, 346, 355, 359, 365, 366, 369, 370

[56] References Cited

U.S. PATENT DOCUMENTS

| | | | |
|---|---|---|---|
| 3,653,932 | 4/1972 | Berry et al. | 106/22 |
| 3,715,219 | 2/1973 | Kurz et al. | 106/22 |
| 4,356,764 | 11/1982 | Haugen | 100/169 |
| 4,363,862 | 12/1982 | Giorgini | 430/98 |
| 4,390,369 | 6/1983 | Merritt et al. | 106/31 |
| 4,484,948 | 11/1984 | Merritt et al. | 106/31 |
| 4,503,111 | 3/1985 | Jaeger et al. | 428/195 |
| 4,547,405 | 10/1985 | Bedell et al. | 427/256 |
| 4,555,437 | 11/1985 | Tanck | 428/212 |
| 4,593,292 | 6/1986 | Lewis | 346/1.1 |
| 4,659,383 | 4/1987 | Lin et al. | 106/27 |
| 4,684,956 | 8/1987 | Ball | 346/1.1 |
| 4,690,858 | 9/1987 | Oka et al. | 428/216 |
| 4,741,930 | 5/1988 | Howard et al. | 346/1.1 |
| 4,745,420 | 5/1988 | Gerstenmaier | 346/76 PH |
| 4,751,528 | 6/1988 | Spehrley, Jr. et al. | 346/140 |

FOREIGN PATENT DOCUMENTS 0187352 12/1985 Denmark .
0206286 6/1986 Denmark .

Primary Examiner—Ellis P. Robinson
Assistant Examiner—P. J. Ryan
Attorney, Agent, or Firm—Jerome S. Marger; John D. Winkelman; Robert S. Hulse

[57] ABSTRACT

A method for producing a light-transmissive phase change ink printed substrate is described which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path.

In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

45 Claims, 1 Drawing Sheet

SUBSTRATES HAVING A LIGHT-TRANSMISSIVE PHASE CHANGE INK PRINTED THEREON AND METHODS FOR PRODUCING SAME

BACKGROUND OF THE INVENTION

The present invention relates to light transmissive phase change inks printed onto substrates and to methods for producing such printed substrates.

In general, phase change inks are in solid phase at ambient temperature, but are liquid at the elevated operating temperature of an ink jet printing device. Liquid phase ink jet drops at the operating temperature are ejected from the printing device and, when the ink drops contact the surface of printing media, they quickly solidify to form a predetermined pattern.

Phase change ink is desirable since it remains in a solid phase at room temperature during shipping, long-term storage, etc. Also, the problems associated with nozzle clogging due to ink evaporation are largely eliminated, thereby improving the reliability of ink jet printing. Furthermore, since the ink droplets rapidly solidify upon contact with the substrate, migration of ink along the printing medium is greatly reduced and image quality is improved. Rapid solidification allows high quality images to be printed on a wide variety of printing media.

The initial prior art on phase change inks for ink jet printing involved monochrome inks jetted by electrostatic printing devices. Thus, for example in U.S. Pat. No. 3,653,932, a low melting ink (30° C. to 50° C.) is provided employing an ink base comprising di-esters of sebacic acid. In a similar process, U.S. Pat. No. 3,715,219 describes another low melting point ink (30° C. to 60° C.) comprising a paraffin alcohol-based ink. However, when low melting point phase change inks are employed in printing onto a substrate, they exhibit offset problems, namely, when the substrates printed with these inks are stacked and stored for subsequent use, they can become adhered to one another, particularly if high ambient temperatures are experienced.

U.S. Pat. Nos. 4,390,369 and 4,484,948 describe methods for producing monochrome phase change inks which employ a natural wax ink base, such as Japan wax, candelilla wax, carnauba wax, etc., which is printed from a drop-on-demand ink jet device at a temperature ranging between 65° C. and 75° C. In U.S. Pat. No. 4,659,383, a monochrome ink composition is provided having an ink base comprising a C20-24 acid or alcohol, a ketone, and an acrylic resin plasticizer. These monochrome ink compositions are not durable and when printed can be smudged with routine handling and folding.

In Japanese patent application No. 128,05,78, aliphatic and aromatic amides, which are solid at room temperature, such as acetamide, are employed as printing inks. U.S. Pat. No. 4,684,956 is directed to monochrome phase change inks utilizing synthetic microcrystalline wax (hydrocarbon wax) and microcrystalline polyethylene wax. This molten composition can be applied to a variety of porous and non-porous substrates using drop-on-demand ink jet application techniques.

Finally, EP Nos. 0187352 and 0206286 reference phase change ink jet printing in color. The ink bases for these systems comprise fatty acids, a thermoplastic polyethylene and a phase change material in the first application; and the alcohol portion of a thermal setting resin pair, a mixture of organic solvents (o-and p-toluene sulfonamide) and a dye in the second application.

There are several references in the prior art to manipulation of images formed from phase change inks, this manipulation taking place either during or after the printing process. In U.S. Pat. No. 4,745,420, droplets of a phase change ink are ejected onto a target and spread thereon by the application of pressure to increase the coverage and minimize the volume of ink that is required to be applied to the surface of the target. In other words, dots of phase change ink which do not initially cover the entire target are spread by pressure application over the entire target surface. Similarly, in xerographic image fusing, the area of contact between the toner and the substrate is substantially increased by causing the toner to spread and penetrate somewhat into the underlying substrate. See "The Physics and Technology of Xerographic Processes", by Williams, published in 1984 by J. Wiley & Sons. The mechanical properties of the toner are such that plastic deformation and flow readily occur. In the case of the phase change ink in U.S. Pat. No. 4,745,420 or the xerographic toner, there is spreading of the ink or toner across the paper to form opaque characters or patterns thereon.

Although the previous references describe fusing of images between a pair of mechanically loaded rollers at ambient temperatures, hot roll fusing has also been used in toner applications. This is a method in which two rolls (one heated) are mechanically loaded together and turned to provide a transient application of heat and pressure to the substrate. The toner is typically heated to above it's glass transition temperature ($T_g$), which enables it to coalesce, flow, and penetrate the substrate. The rolling pressure and capillary action facilitate coverage. (see "Trends and Advances In Dry Toner Fusing", by Dr. John W. Trainer, Institute For Graphic Communication, June 1985).

Another system for applying phase change inks, U.S. Pat. No. 4,751,528, relates to an ink jet apparatus for the controlled solidification of such inks to assist in controlled penetration of the substrate. The apparatus includes a substrate-supporting, thermally conductive platen and heater and a thermoelectric cooling arrangement, both disposed in heat communication with the platen.

Ink jet printing colored inks on to light transmissive media for displaying color images by overhead projection has historically been a problem. For example, in the case of aqueous inks, special coatings must be provided on the light transmissive medium in order to absorb the solvent so that images of high quality are formed. See U.S. Pat. Nos. 4,503,111, 4,547,405 and 4,555,437. Even though special coatings are not required on receptor films used for phase change ink jet printing, when prior art color phase change inks are printed on transparent substrates the image cannot be used in an overhead projection system. There are two reasons for this. Firstly, the inks are not inherently transparent and do not transmit the majority of the light that impinges on them. The second reason is illustrated in FIG. 1. Drops of phase change ink 12 tend to solidify on the substrate 14 as hemispheres which refract light 16 away from the collection lens 18 of the projection system, in a non-rectilinear path, even if the ink itself is optically transparent. Thus the projected image is visible only in contrast, and most of the colors of the image are not apparent. Therefore to date, phase change inks have not been effectively employed for displaying color images by overhead projection techniques.

Accordingly, a need exists for substrates printed with phase change ink which will transmit light in a rectilinear path so that an image comprising intense colors of a predetermined pattern of such phase change ink can be projected.

SUMMARY OF THE INVENTION

The printed substrates of this invention overcome the light transmission problems present in the phase change ink products of the prior art systems described above.

In the present invention, a method for producing a light-transmissive phase change ink printed substrate is described which comprises providing a substrate, and then printing at least one surface of the substrate with a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path.

In one aspect of the invention, the substrate is light transmissive, and the reoriented ink layer on the printed substrate exhibits a high degree of lightness and chroma, and transmits light in a substantially rectilinear path. In this way, the substrate can be used in a projection device to project an image containing clear, saturated colors.

A preferred method for reorienting a phase change ink printed substrate can also be accomplished. First, a substrate is provided having on at least one of its surfaces a pattern of a light-transmissive phase change ink which transmits light in a non-rectilinear path. Then, a layer of phase change ink having a substantially uniform thickness which transmits light in a substantially rectilinear path is formed on the substrate, in a controlled manner, from the phase change ink pattern.

A process for producing a layer of phase change color ink on the surface of a substrate typically starts with the formation of a phase change color ink in the solid phase. Then, the solid phase, phase change color ink is transferred to an application means. The operating temperature of the application means is then raised to a level whereby a liquid phase change ink is formed. The substrate is then provided in close proximity to the application means. Next, a predetermined pattern of liquid phase ink is applied to at least one surface of the substrate. The temperature of the applied ink is then lowered to form a solid phase ink pattern on the substrate. Finally, the solid phase ink pattern is reoriented to produce a layer of substantially uniform thickness that transmits light in a substantially rectilinear path.

More specifically, as depicted in FIG. 2, a substrate 14 is provided onto which drops of a light-transmissive phase change ink are applied to at least one surface in a predetermined pattern. The drops of phase change ink, which are solidified by cooling after application, transmit light in a substantially non-rectilinear path. The phase change ink drops are then reoriented by the controlled formation of a layer of substantially uniform thickness, as hereinafter described, to produce a film of phase change ink which transmits light in a substantially rectilinear path. Thus, since substrate 14 is also light transmissive, printed substrate 20 has a high degree of lightness and chroma, and transmits the beam of light 10 in a substantially rectilinear path 22, thereby forming a projected image having clearly visible intense colors when the beams of light are projected through a collection lens 18.

The foregoing and other objects, features and advantages of the invention will become more readily apparent from the following detailed description of a preferred embodiment which proceeds with reference to the drawings.

DETAILED DESCRIPTION OF THE INVENTION

Figure 1:
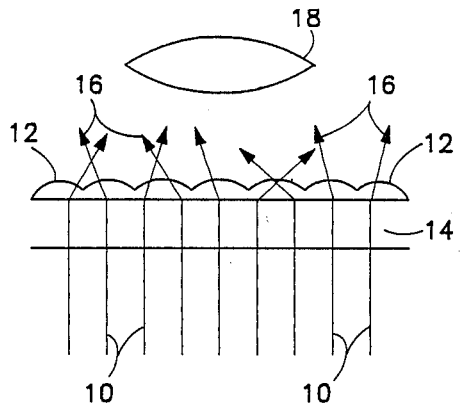
FIG. 1 is a schematic representation of the transmission of beams of light from a light projection source, through a substrate, which transmits light in a substantially non-rectilinear path.

This invention is directed to light-transmissive phase change ink which is printed on substrates, and to methods for producing substrates on which are formed images consisting of a layer of ink of a substantially uniform thickness. Such layers will then transmit light in a substantially rectilinear path.

The subject phase change ink composition comprises the combination of a phase change ink carrier composition and a compatible colorant. The subject phase change ink carrier composition typically comprises a fatty amide-containing material. The fatty amide-containing material of the phase change ink carrier composition of the present invention preferably comprises a tetra-amide compound. The preferred tetra-amide compounds for producing the phase change ink carrier composition are Dimer acid-based tetra-amides which preferably include the reaction product of a fatty acid, a diamine (ethylene diamine) and a Dimer acid. Fatty acids having from 10 to 22 carbon atoms are preferably employed in the formation of the Dimer acid-based tetra-amide. These Dimer acid-based tetra-amides are produced by Union Camp and comprise the reaction product of ethylene diamine, Dimer acid, and the following fatty acids: decanoic acid (Union Camp X3202-23), myristic acid (Union Camp X3202-56), stearic acid (Union Camp X3138-43, X3164-23, X3202-44, X3202-46, X3222-65, X3261-37, X3261-53, and X3290-72), docasanic acid (Union Camp X3202-36). For purposes of this invention, the most preferred Dimer acid-based tetra-amide is the reaction product of Dimer acid, ethylene diamine and stearic acid in a stoichiometric ratio of 1:2:2. Stearic acid is the preferred fatty acid reactant because its adduct with Dimer acid and ethylene diamine has the lowest viscosity of the Dimer acid-based tetra-amides. Its ingredients also are the most readily available and therefore lowest in cost.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl behenamide (Kemamide EX-666), and stearyl stearamide (Kemamide S-180 and Kemamide EX-672), all manufactured by Witco Chemical Company, are extremely useful mono-amides. However, stearyl stearamide is the mono-amide of choice in producing the phase change ink carrier composition of the present invention.

Another way of describing the preferred secondary mono-amide compound of this invention is by structural formula. More specifically, the secondary mono-amide compound is comprised as a composition which is represented by the structural formula:

$$C_xH_y-CO-NHC_aH_b$$

wherein:
x is an integer from 5 to 21
y is an integer from 11 to 43
a is an integer from 6 to 22
b is an integer from 13 to 45

The preferred fatty amide-containing compounds of this invention comprise a plurality of fatty amide materials which are physically compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least about 80° C., and most preferably at least about 85° C.

The preferred phase change ink carrier composition comprises a tetra-amide and a mono-amide. The weight ratio of the tetra-amide to the mono-amide in the preferred instance is from about 2:1 to 1:10, and more preferably, from about 1:1 to 1:3.

In order to add more flexibility and adhesion to the phase change ink carrier composition, a tackifier can be employed. The preferred tackifiers are those which are compatible with fatty amide-containing materials. These include, for example, Foral 85, a glycerol ester of hydrogenated abietic (rosin) acid, and Foral 105, a pentaerythritol ester of hydroabietic (rosin) acid, both manufactured by Hercules Chemical Company; Nevtac 100 and Nevtac 80, synthetic polyterpene resins manufactured by Neville Chemical Company; and Wingtack 86, a modified synthetic polyterpene resin manufactured by Goodyear Chemical Company. However, Foral 105 is the tackifier of choice in producing the phase change ink carrier composition of the present invention.

Another compound which can be added in forming the subject phase change ink carrier composition is a plasticizer which is incorporated into the carrier composition to increase its flexibility and lower its melt viscosity. Plasticizers which have been found to be particularly advantageous in the composition of the subject invention preferably include dioctyl phthalate, diundecyl phthalate, alkylbenzyl phthalate (Santicizer 278) and triphenyl phosphate, all manufactured by Monsanto Chemical Company; tributoxyethyl phosphate (KP-140) manufactured by FMC Corporation; dicyclohexyl phthalate (Morflex 150) manufactured by Morflex Chemical Company Inc.; and trioctyl trimellitate, manufactured by Kodak. However, Santicizer 278 is the plasticizer of choice in producing the phase change ink carrier composition of the present invention.

Other materials may be added to the phase change ink carrier composition. In a typical phase change ink chemical composition, antioxidants are added for preventing discoloration of the carrier composition. The preferred antioxidant materials can include Irganox 1010 manufactured by Ciba Geigy; and Naugard 76, Naugard 512, and Naugard 524 manufactured by Uniroyal Chemical Company; the most preferred antioxidant being Naugard 524.

In a preferred case, the phase change ink carrier composition comprises a tetra-amide and a mono-amide compound, a tackifier, a plasticizer, and a viscosity modifying agent. The preferred compositional ranges of this phase change ink carrier composition are as follows: From about 10 to 50 weight percent of a tetra-amide compound, from about 30 to 80 weight percent of a mono-amide compound, from about 0 to 25 weight percent of a tackifier, from about 0 to 25 weight percent of a plasticizer, and from about 0 to 10 weight percent of a viscosity modifying agent.

As previously indicated, the subject phase change ink formed from the phase change ink carrier composition exhibits excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques. Another excellent property of the ink carrier is that it is amenable to being reoriented into a thin film after printing without cracking or transfering to the rollers typically used for reorientation.

A phase change ink printed substrate is typically produced according to the methods of this invention in a high speed ink jet printing device, such as a drop-on-demand ink jet printer. The phase change ink is applied to at least one surface of the substrate in the form of a predetermined pattern of solidified drops. Upon impacting the substrate surface, the ink drops, which are essentially spherical in flight, wet the substrate, undergo a liquid-to-solid phase change, and adhere to the substrate. Each drop on the substrate surface is non-uniform in thickness and transmits light in a non-rectilinear path.

The pattern of solidified phase change ink drops can, however, be reoriented to produce a light-transmissive phase change ink film on the substrate which has a high degree of lightness and chroma, when measured with a transmission spectrophotometer, and which transmits light in a substantially rectilinear path. The reorientation step involves the controlled formation of a phase change ink layer of a substantially uniform thickness. After reorientation, the layer of light-transmissive ink will transmit light in a substantially rectilinear path. If the substrate on which the subject in is applied is also light transmissive, a projected image having clearly visible intense colors can be formed when a beam of light is projected through the reoriented printed substrate.

The transmission spectra for each of the phase change inks used in this invention were evaluated on a commercially available spectrophotometer, the ACS Spectro-Sensor II, in accordance with the measuring methods stipulated in ASTM E805 (Standard Practice of Instrumental Methods of Color or Color Difference Measurements of Materials) using the appropriate calibration standards supplied by the instrument manufacturer. For purposes of verifying and quantifying the overall colorimetric performance of this invention, measurement data were reduced, via tristimulus integration, following ASTM E308 (Standard Method for Computing the Colors of Objects using the CIE System) in order to calculate the 1976 CIE L* (Lightness), a* (redness-greeness), and b* (yellowness-blueness), (CIELAB) values for each phase change ink sample. In addition, the values for CIELAB Psychometric Chroma, $C^*_{ab}$, and CIELAB Psychometric Hue Angle, $h_{ab}$ were calculated according to publication CIE 15.2, Colorimetry (Second Edition, Central Bureau de la CIE, Vienna, 1986).

Unlike conventional phase change ink carriers, the nature of the phase change ink carrier composition of the present invention is such that thin films of substantially uniform thickness exhibit a relatively high L* value. For example, a substantially uniform thin film of about 20 micron thickness of the phase change ink carrier composition of this invention preferably has an L* value of at least about 65, more preferably at least about 75, and most preferably at least about 85.

The phase change ink carrier composition forms an ink by combining the same with a colorant. Preferably, a subtractive primary colored phase change ink set will be formed by combining the ink carrier composition with compatible subtractive primary colorants. The subtractive primary colored phase change inks of this invention comprise four component dyes, namely, cyan, magenta, yellow and black. Preferably, the subtractive primary colorants employed comprise dyes from either class of Color Index (C.I.) Solvent Dyes and Disperse Dyes. Employment of some C.I. Basic Dyes has also been successful by generating, in essence, an in situ Solvent Dye by the addition of an equimolar amount of sodium stearate with the Basic Dye to the phase change ink carrier composition. Acid Dyes and Direct Dyes have also been found to be compatible to a certain extent.

The phase change inks formed therefrom have, in addition to a relatively high L* value, a relatively high $C^*_{ab}$ value when measured as a thin layer of substantially uniform thickness as applied to a substrate. A reoriented layer of the phase change ink composition of the present invention on a substrate has a $C^*_{ab}$ value, as a substantially uniform thin film of about 20 micron thickness, of subtractive primary yellow, magenta and cyan phase change ink compositions, which preferably are at least about 40 for said yellow ink composition, at least about 65 for said magenta ink composition, and at least about 30 for said cyan ink composition.

Conventional phase change inks used for printing onto substrates have a very low degree of rectilinear light transmissivity, even as layers of substantially uniform thickness, as compared to the layers of phase change inks applied to substrates according to the methods of this invention. Furthermore, reorienting the subject phase change ink printed substrates substantially increases the light transmissivity properties of the ink layer as compared those of a counterpart printed substrate which is not of a uniform thickness and has not been reoriented. More specifically, the increase in the $C^*_{ab}$ value of the respective subtractive primary yellow, magenta and cyan colors of the reoriented ink layers of this invention, as compared to the $C^*_{ab}$ value of the subtractive primary yellow color of said original ink layer which is not of a uniform thickness and has not been reoriented, is at least about 20 for the yellow color, is at least about 35 for the magenta color, and is at least about 15 for the cyan color.

It is also important that the black color phase change ink component be at a minimum light transmissivity level so that it's optical density is maximized. Accordingly, the L* value of a substantially uniform thin film of about 20 micron thickness of a black color phase change ink is preferably not more than about 35, more preferably not more than about 30, and most preferably not more than about 25.

Figure 3:
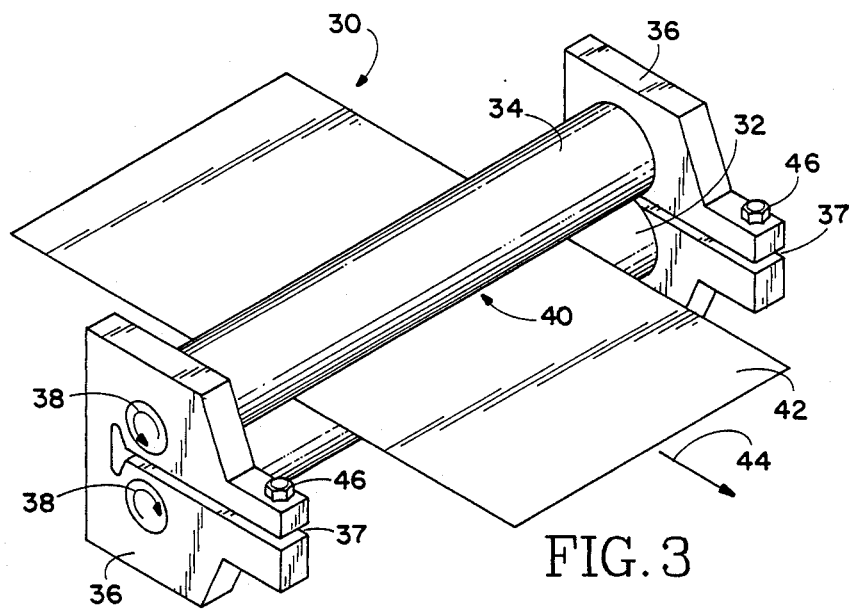
FIG. 3 is a perspective representation of a pressure reorientation system.

The solidified ink drops can be formed into a layer of substantially uniform thickness by the application thereto of pressure, or by a combination of heat and pressure, or by heat only. In the case of the use of pressure only, using for instance, the pressure reorientation system depicted in FIG. 3, the image as originally formed can be reoriented by passing same through a pair of opposed, unheated rolls under controlled conditions of pressure. In this way, a substrate will be produced in which the subject phase change ink layer comprises a layer of substantially uniform thickness. More specifically, FIG. 3 shows a pressure reorientation system 30 in which a pair of rollers 32 and 34, respectively, are journaled within end frames 36 which provide bearing support for rollers 32, and 34. The rollers 32, 34 rotate in the direction indicated by arrows 38. A substrate 42 moves between roller 32, 34 in a direction designated by arrow 44. The loading of the rollers is adjusted by bolts 46 which respectively increase or decrease the force along the line of contact on the substrate moving therewithin. More specifically, the loading on the rollers 32, 34 can be increased or decreased by turning the bolts 46 in a respective clockwise or counterclockwise rotational direction, which in turn will decrease or increase the gap 37 in the end frames 36. This rolling pressure is maintained so that the phase change ink on the substrate can be reoriented to produce a layer of substantially uniform thickness. Roller 32 is preferably a steel core roller having a nylon outer surface layer. Roller 34 is preferably a chrome plated steel roller.

If one of the above-described rollers is heated, a combined heat-pressure reorientation can also be effected which also produces an ink layer of substantially uniform thickness on the substrate. In the heat-pressure case, the pressure required to produce a uniform thickness is less than for pressure only.

Finally, a heat only system can be provided by passing the substrate over a heated platen after printing or exposing the printed substrate to a source of radiant heat after printing. The heat reorientation systems also can be used in conjunction with a subsequent pressure reorientation step.

The substrate on which the ink is printed can be permeable, such as paper and the like, or impermeable, such as a thin transparent film, including polyester films and the like. On a permeable substrate, the phase change ink of this invention becomes embedded into the structure of the substrate during reorientation. For example, if the substrate is paper, the ink fills the voids between the paper fibers. The durability of the printed image is then increased by increasing the bonding contact area of the ink and the paper, and by the fact that the ink has penetrated into the bulk structure of the paper.

Figure 2:
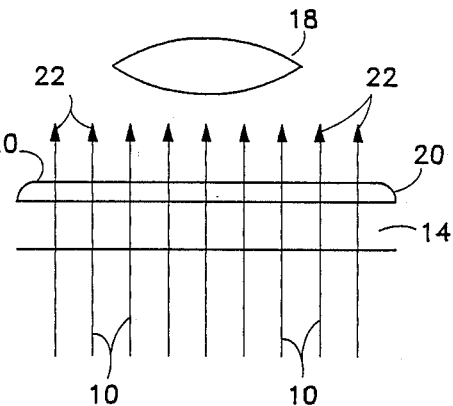
FIG. 2 is a schematic representation of the transmission of beams of light from a light projection, source through a substrate, which transmits light in a substantially rectilinear path.

On a non-permeable substrate, such as a polymeric film or the like, the drops become deformed during reorientation such that the surface of the ink becomes substantially parallel to the surface of the substrate. This is important for overhead projection of images using light transmissive substrates such as thin films. When the outer surface of the ink is parallel to that of the substrate, light beams pass through the ink in a rectilinear manner without being refracted (See FIG. 2.). The durability of the printed substrate is also increased partly due to an increase in contact area between the ink and the substrate.

EXAMPLE 1

This example demonstrates that when the subject phase change ink layer is printed on a substrate and is then reoriented according to the teachings of the present invention, a much higher degree of rectilinear light transmissivity ($C^*_{ab}$) and lightness ($L^*$) will result.

Solid phase change ink ingots of the subtractive primary colors were produced as follows: 56 grams of Kemamide S-180, 30 grams of Unirez X37-523-235 (a Dimer acid-based tetra-amide material manufactured by Union Camp and formed by the reaction of one mole of dimer acid, two moles of ethylene diamine, and two moles of stearic acid), 10 grams of Foral 105, 4 grams of Santicizer 278, and 1 gram of Intratherm Yellow 346 yellow colorant (Crompton and Knowles, C.I. Disperse Yellow 238), were added to a 500 ml. beaker and heated with stirring to a temperature of 150° C. After a homogeneous solution of the materials was achieved, the molten ink was filtered through a heated funnel containing a fine porous stainless steel mesh screen. The filtrate was poured into molds and allowed to solidify. Solid ink ingots of the yellow colorant were formed.

The above procedure was repeated with the other primary colorants required for ink jet color printing being substituted for the yellow colorant as follows: 2 grams of Neptun Red Base NB 543 (BASF, C.I. Solvent Red 49) to produce magenta solid ink ingots; 2.4 grams of Neopen Blue FF-4012 primary cyan colorant (BASF, no Color Index number assigned yet) to produce cyan solid ink ingots; and 3.0 grams of Lampronol Black BR black colorant (ICI, C.I. Solvent Black 35) to produce solid black ink ingots.

A sample of each of the yellow, magenta, cyan and black phase change ink ingots described in paragraph (A) above were added to ink reservoirs of a modified drop-on-demand phase change ink jet printer, and the temperature was raised to an operating level of 150° C. The printer was driven by a piezoelectric ceramic disc operating at 10,000 pulse/sec and had an ink printing head as described in a co-pending application (Serial No. 071,215,126) assigned to the assignee of this invention. The yellow, magenta, cyan and black phase change ink samples described in paragraph (A) above were printed onto light transmissive polyester substrates at a addressability of 300 drops per inch. The samples were subjected to transmission spectra testing before and after conducting the reorientation operation.

The printed substrates, which had a layer of solidified drops of phase change ink of substantially non-uniform thickness, were subjected to a reorientation step employing the procedure described above, and using the pressure reorientation system depicted in FIG. 3. Specifically, the rollers 32 and 34 were each 1.7" in diameter and 9" long. The roller 32 in contact with the printed side of the substrate was fabricated of a steel core covered with a highly polished layer of nylon. The roller 34 was of chrome plated steel construction. The rollers were held in contact at ambient temperature with a force of 60 to 100 pli. The axes of the rollers were skewed relative to each other at a small angle to achieve a more uniform force distribution along the line of contact of the rollers and the printed substrate. One roller was driven rotationally by a motor and gearbox assembly. The light transmissive substrate was James River Graphics 9031-1311 film.

The transmission spectra test data for each color of ink on the original ("O") and reoriented ("R") printed substrate is listed in Table 1 below. (Measurement conditions were: illuminant C, 2 degree observer, small area view, specular included, wavelength interval 10 nm.)

TABLE 1

| Sample | $L^*$ | $a^*$ | $b^*$ | $C^*_{ab}$ | $h_{ab}$ |
| --- | --- | --- | --- | --- | --- |
| cyan-O | 54.53 | −11.54 | −9.75 | 15.11 | 220.18 |
| cyan-R | 72.43 | −26.32 | −18.74 | 32.32 | 215.45 |
| magenta-O | 48.30 | 26.67 | −12.02 | 29.25 | 335.74 |
| magenta-R | 55.65 | 63.91 | −29.64 | 70.45 | 335.12 |
| yellow-O | 60.43 | −5.25 | 20.25 | 20.92 | 104.54 |
| yellow-R | 81.02 | −11.53 | 42.76 | 44.29 | 105.09 |
| red-O | 43.02 | 27.25 | 5.44 | 27.79 | 11.28 |
| red-R | 50.48 | 42.88 | 7.78 | 43.58 | 10.28 |
| green-O | 45.02 | −15.66 | 4.21 | 16.21 | 164.95 |
| green-R | 64.25 | −38.21 | 20.38 | 43.31 | 151.93 |
| blue-O | 37.25 | 13.30 | −26.95 | 30.05 | 296.27 |
| blue-R | 41.14 | 32.98 | −41.40 | 52.77 | 308.68 |

The reoriented subtractive primary colored cyan, magenta and yellow ink printed substrates of this invention had an extremely high degree of rectilinear light transmissivity, as indicated by the high values of $C^*_{ab}$. Moreover, the reoriented printed substrates had a significantly higher degree of rectilinear light transmissivity than the same substrates before the reorientation step. More specifically, the above data indicate respective increases in the $C^*_{ab}$ values of about 17, 41, and 23 respectively, for the primary subtractive printed substrates, and increases of similar magnitude for the secondary subtractive printed substrates.

EXAMPLE 2

The abrasion resistance of respective reoriented and original (as printed) samples, produced in the manner described in EXAMPLE 1, were quantified by measuring the difference in optical density resulting from subjecting the printed areas of the substrates to an abrasive wheel, namely the above-described Tabor Abrader. A CS-10 abrading wheel with a 500 gram weight was used for 10 cycles of that abrasive wheel. The abrasion caused the black printed areas to become lighter, i.e. less optically dense. By measuring the $L^*$ coordinate of each sample before and after abrasion, and taking the difference between these measurements, the change in optical density was quantified. A positive change in optical density indicates a sample became lighter during the abrasion cycle. The smaller the change in optical density, the more resistant the sample is to abrasion. The average change in optical density caused by abrading several original and reoriented printed light transmissive substrate samples was 14.67 for the original samples and 1.34 for the reoriented samples. Therefore, the reoriented print substrate samples were much more resistant to the effects of abrasive forces, i.e., were far more durable, than the original (as printed) counterpart samples.

EXAMPLE 3

The procedure for producing a printed substrate as described in Example 1 was repeated except that one of the pressure rollers was heated. This reduced the force required to be exerted by the rollers to reorient the phase change ink. The apparatus used to demonstrate this combination of heat and pressure consisted of a Teflon ® coated heated roller and a silicone rubber covered pressure roller. The printed images were passed through the rollers with the ink contacting the Teflon ® surface. The Teflon ® coated roller was constructed from aluminum tubing and internally heated with an infrared lamp. The temperature of the Teflon ® surface was controlled over the range from room temperature to 80° C. The rollers were held in contact with a force less than 20 pounds per inch of length.

The enhancements to the image quality of a representative cyan sample resulting from this combination of heat and pressure are described in Table 2 below.

TABLE 2

| Sample | $L^*$ | $a^*$ | $b^*$ | $C^*_{ab}$ | $h_{ab}$ |
|---|---|---|---|---|---|
| cyan-O | 48.45 | −26.71 | −15.85 | 31.06 | 210.69 |
| cyan-R | 63.89 | −34.44 | −23.02 | 41.42 | 213.76 |

Having illustrated and described the principles of the invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for producing a phase change ink printed substrate, which comprises:
   providing a substrate;
   applying to at least one surface of said substrate a predetermined pattern of a light-transmissive phase change ink which transmits light in a non-rectilinear path; and
   forming a layer of light-transmissive phase change ink printed on said substrate in which said pattern of solidified phase change ink has been reoriented and said ink layer has a substantially uniform thickness and transmits light in a substantially rectilinear path.

2. The method of claim 1, which includes the further step of providing a light transmissive substrate, wherein said reoriented printed substrate transmits light in a substantially rectilinear path for enabling the use of said reoriented printed substrate in a projection device to project an image containing clear, saturated colors.

3. The method of claim 1, which further includes the step of providing a phase change ink composition comprising a fatty amide-containing material in combination with a compatible colorant.

4. The method of claim 3, wherein said fatty amide-containing material comprises a tetra-amide compound and a mono-amide compound.

5. The method of claim 1, which further includes the step of providing an ink composition comprising a subtractive primary colored phase change ink composition.

6. The method of claim 1, wherein said ink layer on said printed substrate is substantially abrasion resistant subsequent to reorientation.

7. The method of claim 1, wherein the $C^*_{ab}$ value of said reoriented ink layer comprises a subtractive primary yellow color of at least about 40.

8. The method of claim 1, wherein the $C^*_{ab}$ value of said reoriented ink layer comprises a subtractive primary magenta color of at least about 65.

9. The method of claim 1, wherein the $C^*_{ab}$ value of said reoriented ink layer comprises a subtractive primary cyan color of at least about 30.

10. The method of claim 1, wherein the $L^*$ value of said reoriented ink layer comprises a black color of not more than about 35.

11. A method for reorienting a phase change ink printed substrate which comprises:
    providing a substrate having on at least one of its surfaces a pattern of a light-transmissive phase change ink which transmits light in a non-rectilinear path; and
    forming on said substrate, in a controlled manner, from said phase change ink pattern, a layer of phase change ink having a substantially uniform thickness which transmits light in a substantially rectilinear path.

12. The method of claim 11, which includes the further step of providing a light transmissive substrate which is substantially light transmissive, said formed printed substrate transmitting light in a substantially rectilinear path, thereby enabling the use of said formed printed substrate in a projection device to project an image containing clear, saturated colors.

13. The method of claim 11, which further includes the step of providing said ink composition comprising a subtractive primary colored phase change ink composition.

14. The method of claim 11, wherein the $C^*_{ab}$ value of the subtractive primary yellow color of said formed ink layer is at least about 40.

15. The method of claim 11, wherein the $C^*_{ab}$ value of the subtractive primary magenta color of said formed ink layer is at least about 65.

16. The method of claim 11, wherein the $C^*_{ab}$ value of the subtractive primary cyan color of said formed ink layer is at least about 30.

17. The method of claim 11, wherein the $L^*$ value of the black color of said formed ink layer is not more than about 35.

18. The method of claim 11, wherein the increase in the $C^*_{ab}$ value of the subtractive primary yellow color of said formed ink layer, as compared to the $C^*_{ab}$ value of the subtractive primary yellow color of said original ink layer which is not of a uniform thickness and has not been reoriented, is at least about 20.

19. The method of claim 11, wherein the increase in the $C^*_{ab}$ value of the subtractive primary magenta color of said formed ink layer, as compared to the $C^*_{ab}$ value of the subtractive primary magenta color of said original ink layer which is not of a uniform thickness and has not been reoriented, is at least about 35.

20. The method of claim 11, wherein the increase in the $C^*_{ab}$ value of the subtractive primary cyan color of said formed ink layer, as compared to the $C^*_{ab}$ value of the subtractive primary cyan color of said original ink layer which is not of a uniform thickness and has not been reoriented, is at least about 15.

21. The method of claim 11, wherein said ink layer on said substrated is substantially abrasion resistant subsequent to forming said uniform thickness layer.

22. A method for producing a layer of light transmissive phase change color ink on the surface of a substrate, which comprises:
    forming a phase change color ink composition, in the solid phase, comprising a fatty amide-containing compound and a compatible colorant;
    transferring said solid phase, phase change color ink composition to a phase change ink application means;

raising the operating temperature of said application means to a level whereby a liquid phase, phase change color ink composition if formed;

providing a substrate in close proximity to said application means;

applying a predetermined pattern of said liquid phase, phase change color ink composition to at least one surface of said substrate;

lowering the temperature of said applied ink composition to form a solid phase, phase change ink pattern on the substrate; and forming a layer of substantially uniform thickness in which said pattern of phase change ink has been reoriented and thereby transmits light in a substantially rectilinear path.

23. The method of claim 22, which includes the further step of providing a light transmissive substrate, said reoriented printed substrate transmitting light in a substantially rectilinear path thereby enabling the use of this substrate in a projection device to project an image containing clear, saturated colors.

24. The method of claim 22, which further includes the step of providing said ink composition comprising a subtractive primary colored phase change ink composition.

25. The method of claim 22, wherein the $C^*_{ab}$ value of the subtractive primary yellow color of said reoriented ink layer is at least about 40.

26. The method of claim 22, wherein the $C^*_{ab}$ value of the subtractive primary magenta color of said reoriented ink layer is at least about 65.

27. The method of claim 22, wherein the $C^*_{ab}$ value of the subtractive primary cyan color of said reoriented ink layer is at least about 30.

28. The method of claim 22, wherein the $L^*$ value of the black color of said reoriented ink layer is not more than about 35.

29. The method of claim 22, wherein the increase in the $C^*_{ab}$ value of the subtractive primary yellow color of said reoriented ink layer, as compared to the $C^*_{ab}$ value of the subtractive primary yellow color of said original ink layer which is not of a uniform thickness and has not been reoriented, is at least about 20.

30. The method of claim 22, wherein the increase in the $C^*_{ab}$ value of the subtractive primary magenta color of said reoriented ink layer, as compared to the $C^*_{ab}$ value of the subtractive primary magenta color of said original ink layer which is not of a uniform thickness and has not been reoriented, is at least about 35.

31. The method of claim 22, wherein the increase in the $C^*_{ab}$ value of the subtractive primary cyan color of said reoriented ink layer, as compared to the $C^*_{ab}$ value of the subtractive primary cyan color of said original ink layer which is not of a uniform thickness and has not been reoriented, is at least about 15.

32. The method of claim 22, wherein said ink layer on said substrate is substantially abrasion resistant subsequent to reorientation.

33. A light-transmissive phase change ink printed substrate, which comprises
a substrate; and
a layer of light-transmissive phase change ink printed in a predetermined pattern on at least one surface of said substrate and having a substantially uniform thickness which transmits light in a substantially rectilinear path.

34. The printed substrate of claim 33, wherein said ink layer has been reoriented subsequent to its application to said substrate.

35. The printed substrate of claim 33, wherein said printed substrate transmits light in a substantially rectilinear path thereby enabling the use of said printed substrate in a projection device to project an image containing clear, saturated colors.

36. The printed substrate of claim 35, wherein said ink layer has been reoriented subsequent to its application to said substrate.

37. The printed substrate of claim 33, said ink layer of which is substantially abrasion resistant.

38. The printed substrate of claim 33, wherein said ink composition comprises a subtractive primary colored phase change ink composition.

39. The printed substrate of claim 33, wherein the $C^*_{ab}$ value of the subtractive primary yellow color of said ink layer is at least about 40.

40. The printed substrate of claim 33, wherein the $C^*_{ab}$ value of the subtractive primary magenta color of said ink layer is at least about 65.

41. The printed substrate of claim 33, wherein the $C^*_{ab}$ value of the subtractive primary cyan color of said ink layer is at least about 30.

42. The printed substrate of claim 33, wherein the $L^*$ value of the black color of said ink layer is not more than about 35.

43. The printed substrate of claim 34, wherein the increase in the $C^*_{ab}$ value of the subtractive primary yellow color of said reoriented ink layer, as compared to the $C^*_{ab}$ value of the subtractive primary yellow color of an ink layer which is not of a uniform thickness and has not been reoriented, is at least about 20.

44. The printed substrate of claim 34, wherein the increase in the $C^*_{ab}$ value of the subtractive primary magenta color of said reoriented ink layer, as compared to the $C^*_{ab}$ value of the subtractive primary magenta color of said ink layer which is not of a uniform thickness and has not been reoriented, is at least about 35.

45. The printed substrate of claim 34, wherein the increase in the $C^*_{ab}$ value of the subtractive primary cyan color of said reoriented ink layer, as compared to the $C^*_{ab}$ value of the subtractive primary cyan color of said ink layer which is not of a uniform thickness and has not been reoriented, is at least about 15.

* * * * *